(12) United States Patent
DeLuca

(10) Patent No.: US 9,888,736 B1
(45) Date of Patent: Feb. 13, 2018

(54) FASTENER FOR GARMENT DRAWSTRINGS, LACES, AND THE LIKE

(71) Applicant: Charles DeLuca, Merrick, NY (US)

(72) Inventor: Charles DeLuca, Merrick, NY (US)

( * ) Notice: Subject to any disclaimer, the term of this patent is extended or adjusted under 35 U.S.C. 154(b) by 0 days.

(21) Appl. No.: 15/141,104

(22) Filed: Apr. 28, 2016

Related U.S. Application Data

(62) Division of application No. 14/339,311, filed on Jul. 23, 2014, now Pat. No. 9,347,522.

(51) Int. Cl.
*A41F 9/02* (2006.01)
*A43C 9/00* (2006.01)
*A43C 7/00* (2006.01)

(52) U.S. Cl.
CPC ............... *A41F 9/025* (2013.01); *A43C 7/00* (2013.01); *A43C 9/00* (2013.01); *Y10T 24/3711* (2015.01); *Y10T 24/3724* (2015.01); *Y10T 24/3918* (2015.01)

(58) Field of Classification Search
CPC ............. Y10T 24/3703; Y10T 24/3924; Y10T 24/3916; Y10T 24/3927; Y10T 24/3969; Y10T 24/3973; A41F 9/025; A43C 9/00; A43C 7/00
See application file for complete search history.

(56) References Cited

U.S. PATENT DOCUMENTS

| 1,756,356 | A | * | 4/1930 | Hill | B65D 5/6611 24/127 |
| 1,773,545 | A | * | 8/1930 | Pommer | A43C 7/00 24/18 |
| 5,119,539 | A | * | 6/1992 | Curry | A43C 7/00 24/130 |
| 5,953,800 | A | * | 9/1999 | Duckett | A43C 7/00 24/129 R |
| 2012/0284976 | A1 | * | 11/2012 | Cox | A43C 7/00 24/712.4 |

FOREIGN PATENT DOCUMENTS

WO  WO 2015/047106 A1 * 4/2015

* cited by examiner

*Primary Examiner* — Robert Sandy
*Assistant Examiner* — Michael S Lee
(74) *Attorney, Agent, or Firm* — Allen R. Morganstern; Alfred M. Walker

(57) ABSTRACT

A fastener connects two strings together, such as the drawstring of sweatpants or the two shoe lace strings ends of respective shoe lace strings in a pair of sneakers. The body of the fastener is made out of a material, such as highly dense polyurethane foam, that is strong, yet flexible, or of a rigid plastic, that is strong, yet flexible. The two strings to be fastened pass through one or more gripping and/or locking holes in the fastener body. When the shoelace is passed through the gripping and/or locking holes, the dense polyurethane foam grips the lace tightly. The free ends are pulled through one or more peripheral slits extending towards, but not all the way to, the gripping and/or locking holes and then bent against the upper outer surface of the disk and locked in place in the respective one or more peripheral locking slits.

18 Claims, 5 Drawing Sheets

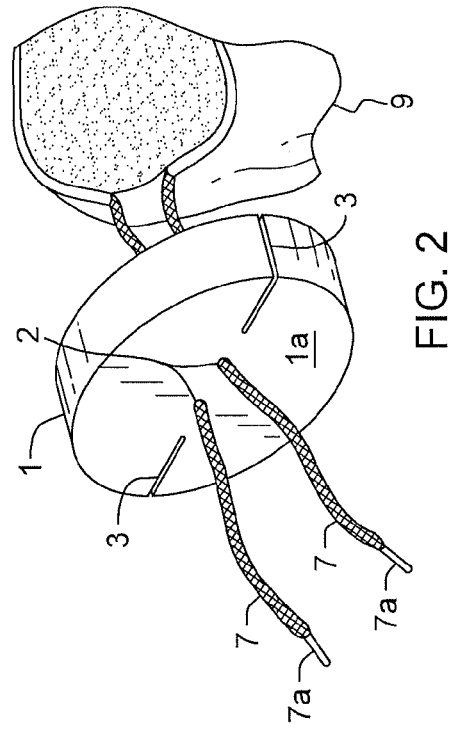
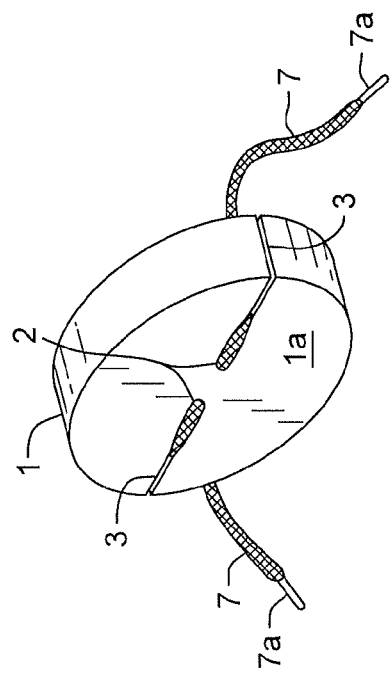
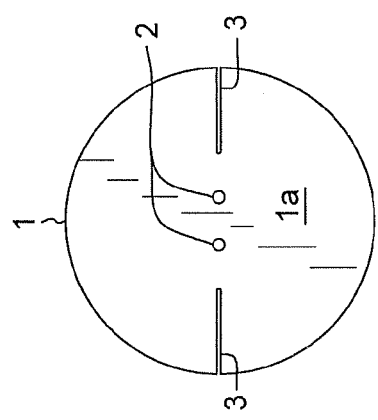

STEP 1

STEP 2

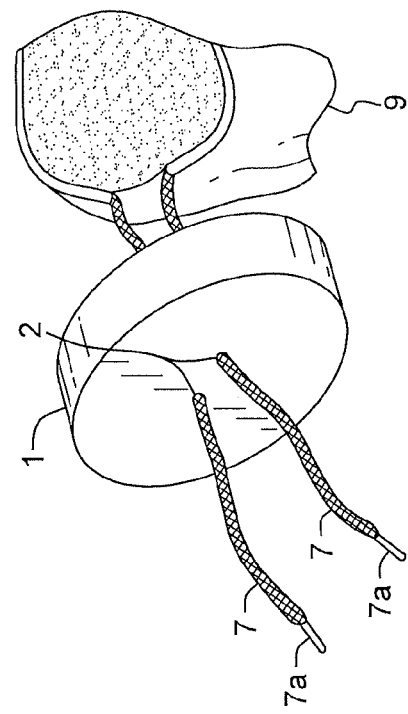
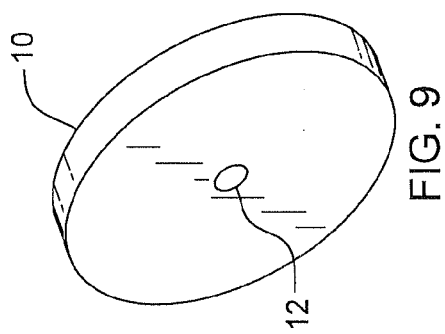
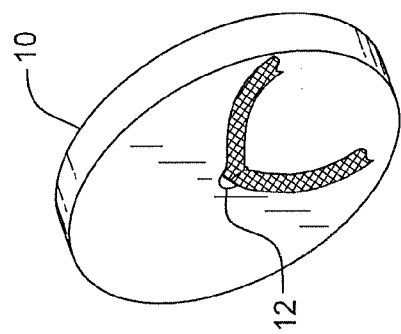

FASTENER FOR GARMENT DRAWSTRINGS, LACES, AND THE LIKE

RELATED APPLICATIONS

This application is a divisional of application Ser. No. 14/439,311, filed Jul. 23, 2014, and claims priority under 35 U.S.C. § 120 therefrom. The '311 application is incorporated by reference herein.

FIELD OF THE INVENTION

The present invention relates to fasteners for garment drawstrings, laces, and other flexible string cable fasteners.

BACKGROUND OF THE INVENTION

Several types of garments such as sweatpants and pajama bottoms use drawstrings to secure the garment to the wearer. Aprons frequently use fabric ties (apron strings). Shoes and sneakers commonly use laces. In all such cases, knots and/or bows are commonly used to secure the free ends of the tying members.

The prior art of Cox (USPTO published application US 2012/0284976) pertains to a shoe lace apparatus and locking mechanism. A rigid disk with a central hole and locking slit directly connecting the hole to the periphery of the disk is used to secure or lock the shoe laces within the hole of the disk. The laces are pinched by the disk at one point and the friction is used for the locking action.

Cox teaches that the lace is inserted all the way through the slit until the slit is tightened by the hole or gripping and/or locking holes in the center or central area of the disk. However, Cox does not teach the use of partially extending slits separated from the central hole. Cox is concerned with using the slit to gain access to the central hole or holes, not to provide a surface area against which to bend the draw string or lace while the draw string or lace is bent over the surface between the central hole and the partially extending slit.

Thus, Cox teaches full access must be provided through the slit to access the central hole or holes, within which the drawstring or lace is tightened.

To that end, Cox does not provide for tightening the draw string or lace through one or more central holes, then bending a draw string or lace over a surface of the disk separating the inner end of a slit and the central hole or holes, and then again bending each draw string or lace again through the slit for further retightening in place in the disk.

OBJECTS OF THE INVENTION

It is therefore an object of the present invention to provide a fastener for garment draw strings or shoe laces which tightens the draw string or shoe lace against a portion of a disk or other flat geometric fastener and then again through a slit or slits spaced apart from and terminating without communication with either of the central gripping and/or locking hole or holes.

It is also an object of the present invention to provide a draw string or shoe lace fastener which is easily used but which provides a tight fit for the draw string or shoe lace, without the need to tighten the draw string or shoe lace with a time consuming knot, which may untie by continued use.

Other objects will become apparent from the following description of the present invention.

SUMMARY OF THE INVENTION

In keeping with these objects and others which may become apparent, the present invention is a lace and string fastener, which is used to fasten together the two strings contained in a pair of sweatpants in such a way so that the wearer's sweatpants won't fall down. The fastener can be easily tightened and loosened without the worry and inconvenience of knot formation. The fastener can be used in a variety of other ways. For example, it can also be used in joining together the two laces in a pair of sneakers.

The present invention uses a disk with one or more centrally located gripping and/or locking holes and one or more locking slits on the periphery of the disk to secure drawstrings, laces, apron strings or similar items in lieu of tying with knot and/or bow. In this manner the worry and inconvenience of knot formation is avoided while providing a fastener that can be tightened and loosened easily. It is important that the peripheral locking slits are separated from the central gripping and/or locking hole or holes to support the method of secure locking involving bending the drawstring taut over the front surface and providing more than one point of squeezing the drawstring.

In the preferred embodiment, the body of the fastener is a thick disk of dense, flexible, yet strong material such as dense polyurethane foam. This material also has a high coefficient of friction which engages laces or drawstrings well. Other synthetic or man-made materials that are flexible and/or rigid may be used in making the body of the fastener. For high end decorative keepsake memorabilia items, the fastener can alternatively be made of metal or precious metal.

One or more small separate gripping and/or locking holes are in the central area of the disk. They are significantly smaller than the relaxed crossectional diameter of the drawstring. The free ends of the drawstring are passed through each hole respectively by stretching the disk holes locally thereby grasping the drawstring securely. The disk is then adjusted as desired to secure the garment, then each end of the drawstring is bent taut over the front surface of the disk and pulled into a locking peripheral slit. When using a material such as dense polyurethane foam, the locking slits can be formed as simple slits since the flexibility of the material will yield locally to permit entry of a drawstring end thereby locking it securely. The slits are sufficiently narrow with sidewalls of the slits having a sufficiently high coefficient of friction to prevent loosening of the drawstring while in service of being worn or otherwise used. Thus, in the preferred embodiment, each drawstring end is first grasped by the central hole which still permits adjustment, then a second point of frictional locking in series with the first is provided by sliding the free end in the peripheral slit. This provides a locking fastener with great pull-out resistance by virtue of the high coefficient of friction, the grasping of the drawstring by the central hole, and the locking in the slit whereby each free end also undergoes two right angle bends. This is because in this embodiment, the gripping and/or locking holes in the fastener are more like potential holes and slits, because after the gripping and/or locking hole or slit is made, the dense polyurethane foam all but closes up again. When the shoelace is passed through the gripping and/or locking holes and slits, the dense polyurethane foam grips the lace tightly.

The method of use the preferred first embodiment of fastening a drawstring extending from a garment without use of a knot, using one or more central gripping and/or locking holes includes the following steps of:

a) using a first aglet on an end of a first end portion of the drawstring to push the first end portion through at least one first central gripping and/or locking hole in a disk;

b) using a second aglet on an end of a second end portion of the drawstring to push the second end portion optionally through the first central gripping and/or locking hole or through a second central gripping and/or locking hole in the disk, the central holes being spaced from each other;

c) folding and pulling taut said first end portion through at least one first peripheral locking slit extending inwardly from an outer periphery of the disk; and, d) folding and pulling taut the second end portion optionally through the first peripheral locking slit or through a second peripheral locking slit extending inwardly from the outer periphery of the disk; and, e) the slits being sufficiently narrow with sidewalls of the slits having a sufficiently high coefficient of friction to prevent loosening of the drawstring while in service of being worn or otherwise used.

In the first embodiment, the disk can have a variety of peripheral shapes. Also, the thickness of the disk material can be uniform, or it can vary with a variation from the center to the edges so that side profiles such as hemispheres, cubes or spheres are also possible. Extra peripheral slits afford more convenience and more locking power when needed, as well.

In a second embodiment, a rigid plastic disk with a single central hole is used with two parallel locking slits (one longer than the other) on each side of the hole. The plastic disk material may be selected from a wide variety of resins such as rigid polyvinyl chloride (PVC), Nylon, polypropylene, or a rigid closed-cell foamed PVC such as, for example, SINTRA® of 3A Composites USA, Inc., Statesville, N.C. In this embodiment, wrapping of the drawstring free ends completely around the median disk material between the two slits on each side of the hole produces great pull-out resistance even using a thinner disk with lower friction between drawstrings and disk material. For high end decorative keepsake memorabilia items, the fastener can alternatively be made of metal or precious metal.

The method of use of the second embodiment of fastening a drawstring extending from a garment without use of a knot using the preferred embodiment with a single central hole includes the following steps of:

a) using a first aglet on an end of a first end portion of the drawstring to push the first end portion through at least one central gripping and/or locking hole in a disk;

b) using a second aglet on an end of a second end portion of the drawstring to push the second end portion through the at least one central gripping and/or locking hole or a second central gripping and/or locking hole, c) folding and pulling taut the first end portion through a first peripheral locking slit extending inwardly from an outer periphery of the disk;

d) folding and pulling taut the second end portion through a second peripheral locking slit extending inwardly from the outer periphery of the disk;

e) folding and pulling taut the first end portion through a third peripheral locking slit extending inwardly from the outer periphery of the disk; and f) folding and pulling taut the second end portion through a fourth peripheral locking slit extending inwardly from the outer periphery of the disk;

g) the slits being sized to squeeze the end portions and provide some pull-out resistance with only a moderate amount of friction.

Therefore, in general, the fastener for drawstrings, laces and the like includes a disk with one or more gripping and/or locking holes in a central region and one or more peripheral locking slits spaced apart from and terminating without communication with either of the one or more gripping and/or locking holes. The fastener fastens drawstrings for clothing, such as sweat pants, as well as laces, such as shoe or sneaker laces, each having two free ends, wherein the free ends are passed through the one or more gripping and/or locking holes in central region of the fastener. The free ends are pulled through the one or more gripping and/or locking holes and then bent against the upper outer surface of the disk and locked in place in the respective one or more peripheral locking slits.

BRIEF DESCRIPTION OF THE DRAWINGS

The present invention can best be understood in connection with the accompanying drawings. It is noted that the invention is not limited to the precise embodiments shown in drawings, in which:

FIG. 1 is a plan view of the fastener of the preferred embodiment of this invention;

FIG. 2 is a perspective view of the preferred embodiment with drawstring ends engaged through the two central gripping and/or locking holes permitting adjustment;

FIG. 3 is a perspective view of the preferred embodiment in a locked configuration with drawstring ends locked in peripheral slits;

FIG. 9 is a perspective view of an embodiment of a fastener with at least one central gripping and/or locking hole and no slit.

FIG. 10 is a perspective view of the fastener of FIG. 9, shown with a portion of a drawstring extending therethrough.

FIG. 11 is a perspective view of an embodiment of a fastener with two central gripping and/or locking holes, with no slits, showing portions of a drawstring extending therethrough.

DETAILED DESCRIPTION OF THE INVENTION

Figure 4A:
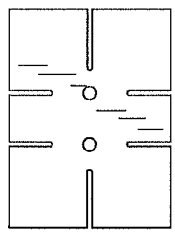
FIGS. 4A to 4F are plan views of outer contours of the disks that can be used with this invention; wherein a round shape is shown at "4A", an oval shape is shown at "4B", a rectangular shape is shown at "4C", a hexagonal shape is shown at "4D", an octagonal shape is shown at "4E" and a circular shape with two opposite pairs of slits is shown in 4F.
Figure 4B:
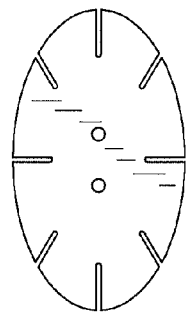
Figure 4C:
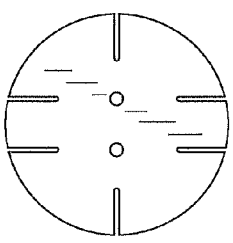
Figure 4D:
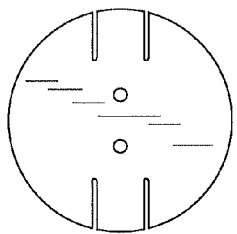
Figure 4E:
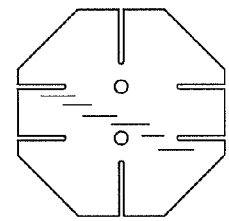
Figure 4F:
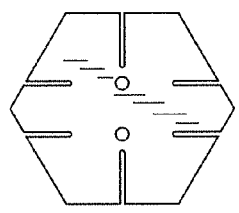

In this invention, the operational description focuses on the term drawstring. It is noted herein that the terms lace or fabric tie, or even string, can be used interchangeably, as the fastener can be used as well for a variety of garments or other uses such as duffle bags, beach bags, laundry bags, or decorative bands each with their favorite name for a fabric tie. Additionally, a decorative shoe lace can be used as a belt for pants with belt loops holding the drawstring as a belt-type fastener. It is also known that the fastener can be adorned with logos or other decorative indicia, such as a cubic shaped fastener bearing the markings of a gaming dice piece. Sports or entertainment logos and characters can also adorn the fastener.

The preferred embodiment of fastener of this invention is illustrated in FIGS. 1-3.

In FIG. 1, a thick semi-rigid disk 1, such as, for example, a dense polyurethane foam disk 1, has a plurality of centrally located gripping and/or locking holes, such as, for example, two centrally located gripping and/or locking holes 2 and two peripheral locking slits (here shown as slits) 3. Locking slits 3 are sufficiently narrow with sidewalls of slits 3 having a sufficiently high coefficient of friction to prevent loosening of the drawstring while in service of being worn or otherwise used. While the length and width of the slits may vary, the width of the slits 3 are preferably in the range of ⅟32 to ⅟16 inch in width.

In FIG. 2, disk 1 is shown being threaded through by the aglets 7a of the free ends 7 of a drawstring which is engaged with a garment 9, such as a pair of sweatpants. In this configuration, adjustment of disk 1 relative to string ends 7 is possible even though gripping and/or locking holes 2 grasp string ends 7 aggressively due to the small diameter of gripping and/or locking holes 2 relative to string diameter and the high coefficient of friction and elastomeric nature of disk 1 material. Once adjusted as desired, each free end 7 is bent 90 degrees along the front surface 1a of disk 1 and then engaged in adjacent slit 3 for locking with high pull-out resistance (as shown in FIG. 3). End aglets 7a of the free ends 7 of the draw strings provide a grasping space for the fingers of the wearer of the garment.

Figure 5A:
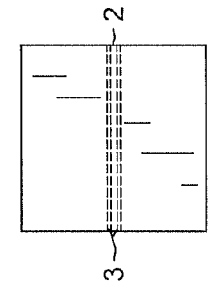
FIGS. 5A to 5D are side views of four different disk implementations; a thick disk of uniform thickness is shown at "5A", a hemispherical side contour is shown at "5B", a spherical side contour is shown at "5C" and a cubic side contour is shown at 5D.
Figure 5B:
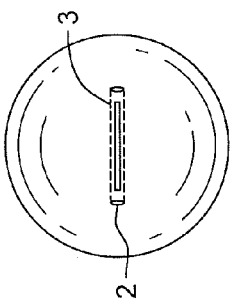
Figure 5C:
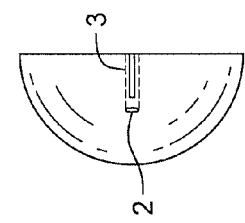
Figure 5D:
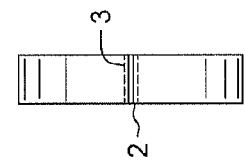

FIGS. 4A to 4F and 5A to 5D show that the outer contour of disk 1 can be almost any shape enclosing a significant flat area. Some useful shapes are shown in FIGS. 4A through 4F. It is also noted that more than two peripheral slits are shown for convenience. Any pair can be used; multiple slits on each string end 7 can also be used for even greater security although hardly needed. Similarly, the thickness of disc 1 need not be constant as shown in FIG. 5A. A hemispherical side contour such as at FIG. 5B, a fully spherical shape such at FIG. 5C or even a cubic shape such as in FIG. 5D can be utilized. The locking slits are sufficiently narrow with sidewalls of the slits having a sufficiently high coefficient of friction to prevent loosening of the drawstring while in service of being worn or otherwise used.

Figure 7A:
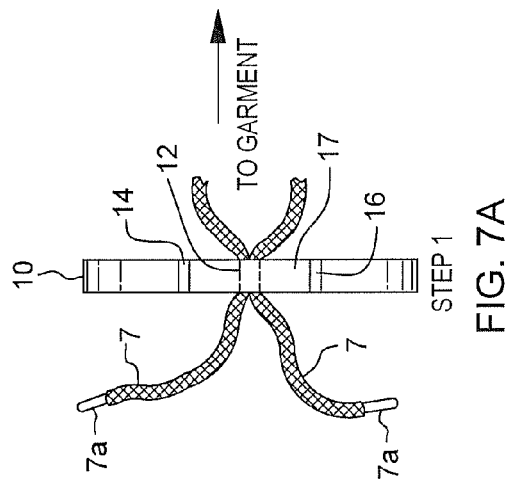
FIGS. 7A and 7B are side views of two steps of using the fastener of FIG. 6; wherein step 1 of FIG. 7A involves pulling both drawstring free ends through the central hole providing the adjustment configuration, while step 2 of FIG. 7B shows the locking method of inserting a free end in a long slit at "A", bending over the back surface and engaging a short slit at "B" and then bending over front surface again and reinserting in the long slit at "C"; and, FIG. 8 is a plan view of the fastener of the second embodiment in a locked configuration.
Figure 8:
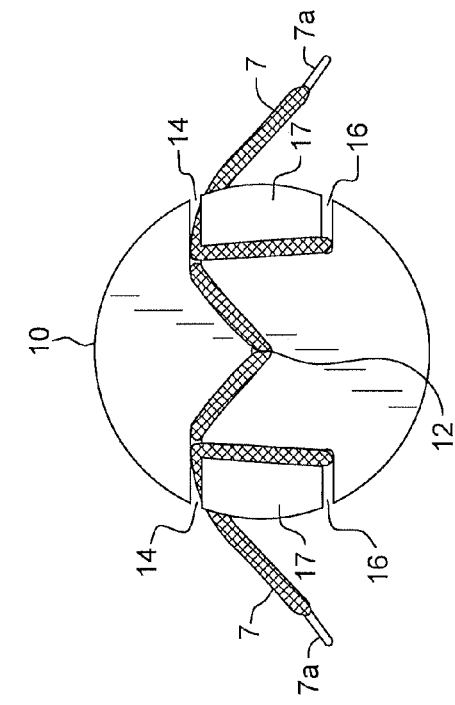
Figure 6:
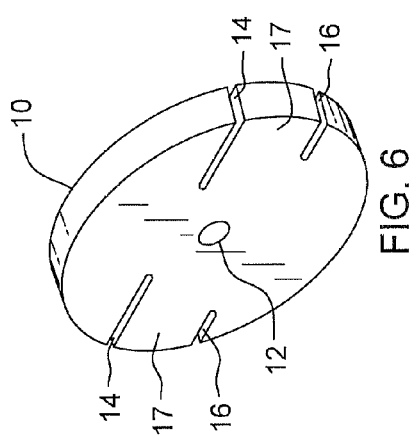
FIG. 6 is a perspective view of the disk fastener of the second embodiment.

FIGS. 6-8 illustrate an alternate embodiment of this invention. FIG. 6 shows disk 10 made of rigid yet flexible plastic with one central hole 12 and a pair of locking slits (long 14 and short 16) on either side of hole 12. Note the median section 17 of disk 10 between slits 14 and 16. To insure excellent pull-out resistance (once locked) with less friction between string free ends 7 and disk 10 than that of the preferred embodiment, free ends 7 are wrapped 360 degrees around median area 17 to compensate. This motion also involves four 90 degree bends of each free end 7 and four series points of squeezing of drawstring in central hole and two slits. Slits 14 and 16 are sufficiently narrow with sidewalls of the slits 14 and 16 having a sufficiently high coefficient of friction to prevent loosening of the drawstring while in service of being worn or otherwise used.

Figure 7B:
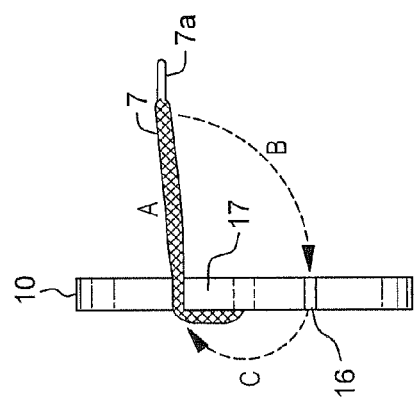

FIGS. 7A and 7B show the two steps of adjusting and locking using disk 10. Step 1 of FIG. 7A involves threading both free ends 7 through central hole 12. This squeezes both free ends 7 against the sides of hole 12 by virtue of the size of the hole and the resiliency of the drawstring material. Disk 10 can be easily adjusted since the grasping action is not too aggressive. The wrapping and locking takes place in step 2 of FIG. 7B as detailed in sub-steps A, B, and C. Peripheral slits are sized to squeeze free ends 7 and provide some pull-out resistance with only a moderate amount of friction. It is the totality of free-end 7 engagement with disk 10 that provides the aggregate amount of disk 10 to drawstring pull-out resistance. This embodiment may be preferable for use on sneakers or sport shoes since disk 10 can be thinner and smaller than disk 1. FIG. 8 shows a front view of the locked configuration.

FIG. 9 shows an embodiment of a fastener 10 with at least one central gripping and/or locking hole 12 and no slit.

FIG. 10 shows the fastener 10 of FIG. 9, shown with a portion of a drawstring extending through central gripping and/or locking hole 12.

FIG. 11 shows an embodiment of a fastener 1 with two central gripping and/or locking holes 2, with no slits, showing portions 7 of a drawstring with aglets 7a extending therethrough.

It is further noted that while FIGS. 1-3 show the fastener made of a compressible material, such as dense polyurethane foam, for example, and FIGS. 6-8 show a rigid plastic material for the fastener, it is noted that the embodiment shown in FIGS. 1-3 can alternatively be made with a rigid plastic, and the embodiment shown in FIGS. 6-8 can likewise be alternatively made with a compressible material, such as, for example, dense polyurethane foam.

Figure 12:
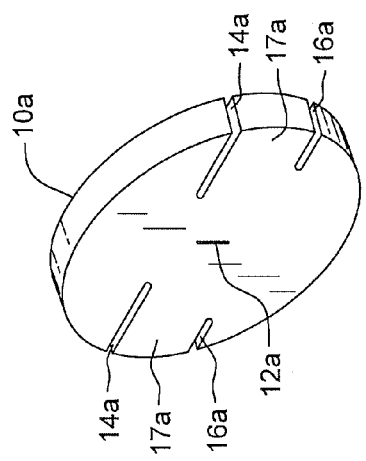
FIG. 12 is a perspective view of the disk fastener of an alternate embodiment with a normally closed central locking/gripping hole.
Figure 12A:
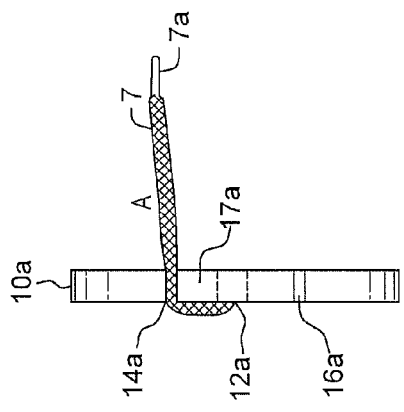
FIG. 12A is a side view of using the fastener in the disk fastener of FIG. 12.

FIGS. 12 and 12A illustrate a further alternate embodiment of this invention. FIG. 12 shows disk 10a made of polyurethane foam with one normally closed central locking/gripping hole 12a in the form of an openable slit, and a pair of locking slits (long 14a and short 16a) on either side of normally closed locking/gripping hole 12a. To insure excellent pull-out resistance (once locked) with less friction between draw string free ends 7 with aglet 7a and disk 10a, free ends of draw string 7 are wrapped 360 degrees around median area 17a to compensate, and then inserted in locking slit 14a. Slits 14a and 16a are sufficiently narrow with sidewalls of the slits 14 and 16 having a sufficiently high coefficient of friction to prevent loosening of the drawstring 7 while in service of being worn or otherwise used.

Moreover, it is also noted that while FIGS. 1-3 show pairs of slits of equal length and FIGS. 6-8 show pairs of slits of different lengths, it is noted that the slits of a compressible material of FIGS. 1-3 can alternatively be of different lengths, and that alternatively, the slits of FIGS. 6-8, made of a rigid lightweight plastic material, can alternatively be of equal lengths. Also the user may select whatever slits he or she wants to use, if one or more of the slits gets worn from repeated washing.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A fastening system for a garment worn by a user/wearer, comprising:
   a drawstring extending from said garment for tightening said garment on said user/wearer;
   a disk with at least one gripping and/or locking hole in a central region, said at least one gripping and/or locking hole having a sufficiently narrow diameter and having a sufficiently high coefficient of friction to prevent loosening of the drawstring inserted therethrough;
   at least one peripheral locking slit penetrating said disc completely and having spaced sidewalls parallel to each other over a full length thereof extending inward from an outer periphery of said disk;
   said peripheral locking slit spaced apart from and terminating without communication with said at least one hole in said central region, said peripheral slit being sufficiently narrow with sidewalls of said peripheral locking slit having a sufficiently high coefficient of friction to prevent loosening of the drawstring while in service;
   an end portion of said drawstring passing once through said at least one gripping and/or locking hole in said central region;
   said end portion of said drawstring extending over and only across a top surface of said disk and bending through said at least one peripheral locking slit and without use of any knot in said drawstring or other device to tie said drawstring around the waist of the user.

2. The fastening system of claim 1 wherein said at least one peripheral locking slit is a plurality of locking slits, wherein free ends of the drawstring make right angle bends over a respective pair of peripheral locking slits.

3. The fastening system of claim 1 wherein said at least one gripping and/or locking hole is a plurality of gripping and/or locking holes; and
   said at least one peripheral locking slit is a plurality of peripheral locking slits,
   said drawstring having first and second end portions each extending through only one of said central gripping and/or locking holes; each said spaced central gripping and/or locking hole having a sufficiently narrow diameter and having a sufficiently high coefficient of friction to prevent loosening of the drawstring inserted therethrough;
   said plurality of locking peripheral slits each extending inwardly from an outer periphery of said disk and terminating without communication with either of said central gripping and/or locking holes, said slits penetrating said disc completely and having spaced sidewalls parallel to each other over a full length thereof;
   each said end portion of said drawstring being pulled taut through its respective central hole, making a right angle bend, and folded over through one of said slits; and
   said slits being sufficiently narrow with sidewalls of said slits having a sufficiently high coefficient of friction, and said right angle bends, to prevent loosening of said drawstring while in service of being worn or otherwise used without use of a knot.

4. The fastening system of claim 1 in which a cross sectional diameter of said central gripping and/or locking hole is smaller than a relaxed cross sectional diameter of said drawstring.

5. The fastening system of claim 1 in which said disk is made from a material having sufficient flexibility and said slits are sufficiently narrow in width to allow said material to yield locally to permit entry of said drawstring.

6. The garment drawstring fastening system for a garment having a drawstring tightening the garment around the body of a user/wearer, of claim 1 in which said at least one central gripping and/or locking hole is normally closed and yields to opening by insertion of aglets on ends of respective end portions of said drawstring.

7. The garment drawstring fastening system for a garment having a drawstring tightening the garment around the body of a user/wearer, of claim 2 in which said peripheral locking slits of said plurality of locking peripheral slits are equal in length.

8. The fastening system of claim 2 in which said peripheral locking slits are parallel to each other.

9. The fastening system of claim 1 wherein said disk is circular.

10. The garment drawstring fastening system for a garment having a drawstring tightening the garment around the body of a user/wearer, of claim 1 in which said disk is oval.

11. The garment drawstring fastening system for a garment having a drawstring tightening the garment around the body of a user/wearer, of claim 2 in which each of said plurality of slits extend radially outward from a central region of said disk, without being in communication with said plurality of central holes.

12. The garment drawstring fastening system for a garment having a drawstring tightening the garment around the body of a user/wearer, of claim 1 in which said disk is polygonal shaped.

13. The garment drawstring fastening system for a garment having a drawstring tightening the garment around the body of a user/wearer, of claim 12 in which said disk is square shaped.

14. The garment drawstring fastening system for a garment having a drawstring tightening the garment around the body of a user/wearer, of claim 1 in which said disk is rectangular shaped.

15. The garment drawstring fastening system for a garment having a drawstring tightening the garment around the body of a user/wearer of claim 1 where said at least one central gripping and/or locking hole comprises two holes.

16. The garment drawstring as in claim 1 wherein said at least one central hole is at least one flexible longitudinally extending slit linear slit in a central region, said gripping, locking slit in said central region being significantly smaller than a relaxed cross-sectional diameter of said drawstring;
   said at least one gripping and/or locking slit each having a sufficiently high coefficient of friction to prevent loosening of the drawstring inserted therethrough.

17. A garment drawstring fastening system for a garment having a drawstring tightening the garment around the body of a user/wearer, comprising:
   a disk with at least one gripping and/or locking hole in a central region, said at least one gripping and/or locking hole having a sufficiently narrow diameter and having a sufficiently high coefficient of friction to prevent loosening of the drawstring inserted therethrough;
   a plurality of peripheral locking slits penetrating said disc completely and having spaced sidewalls parallel to each other over a full length thereof extending inward from an outer periphery of said disk;

said peripheral locking slits spaced apart from and terminating without communication with said at least one hole in said central region, said peripheral slits being sufficiently narrow with sidewalls of said peripheral locking slit having a sufficiently high coefficient of friction to prevent loosening of the drawstring while in service;

an end portion of said drawstring passing through said at least one gripping and/or locking hole in said central region;

said end portion of said drawstring extending across a top surface of said disk and bending through said at least one peripheral locking slit and without use of any knot in said drawstring or other device, to tie said drawstrings around the waist of the user;

wherein free ends of the drawstring make right angle bends over a respective pair of peripheral locking slits; and one of said first peripheral locking slits in said plurality of locking peripheral slits is longer than said other slits thereof.

18. A garment drawstring fastening system for a garment having a drawstring tightening the garment around the body of a user/wearer, comprising:

a disk with at least one gripping and/or locking hole in a central region, said at least one gripping and/or locking hole having a sufficiently narrow diameter and having a sufficiently high coefficient of friction to prevent loosening of the drawstring inserted therethrough;

a plurality of peripheral locking slits penetrating said disc completely and having spaced sidewalls parallel to each other over a full length thereof extending inward from an outer periphery of said disk;

said peripheral locking slits spaced apart from and terminating without communication with said at least one hole in said central region, said peripheral slits being sufficiently narrow with sidewalls of said peripheral locking slit having a sufficiently high coefficient of friction to prevent loosening of the drawstring while in service;

an end portion of said drawstring passing through said at least one gripping and/or locking hole in said central region;

said end portion of said drawstring extending across a top surface of said disk and bending through said at least one peripheral locking slit and without use of any knot in said drawstring or other device, to tie said drawstrings around the waist of the user;

wherein free ends of the drawstring make right angle bends over a respective pair of peripheral locking slits; and and wherein said peripheral locking slits are parallel to and in alignment with each other.

* * * * *